United States Patent [19]

Shimano et al.

[11] 4,077,603

[45] Mar. 7, 1978

[54] INFINITESIMAL GAS FLOW REGULATOR

[75] Inventors: Takashi Shimano, Ichihara; Katsumi Orimo, Chiba; Shoji Yamamoto, Ichihara, all of Japan

[73] Assignee: The Furukawa Electric Co., Ltd., Tokyo, Japan

[21] Appl. No.: 679,504

[22] Filed: Apr. 22, 1976

[51] Int. Cl.² .................. F16K 5/10; F16K 31/50
[52] U.S. Cl. .................... 251/205; 251/208; 251/303
[58] Field of Search ............ 251/205, 303, 298, 208, 251/315

[56] References Cited

U.S. PATENT DOCUMENTS

| 2,299,599 | 10/1942 | Shultz | 251/303 |
| 2,448,649 | 9/1948 | Adams et al. | 251/205 X |
| 2,613,908 | 10/1952 | Palen | 251/315 X |
| 2,752,945 | 7/1956 | Patterson et al. | 251/303 X |
| 3,536,296 | 10/1970 | Burris | 251/208 |

Primary Examiner—Arnold Rosenthal
Attorney, Agent, or Firm—Wenderoth, Lind & Ponack

[57] ABSTRACT

An infinitesimal gas flow regulator has a valve seat member having a valve seat provided at a gas inlet thereof, and a valve body including a hemispheric portion seated on the valve seat so that said valve body is rollingly movable about the center of the hemispheric portion while the valve body is kept on said valve seat. The valve body has an orifice in the form of a notch provided in the hemispheric portion of said valve body. An adjusting screw is provided to adjust the position of the valve body about the center of the hemispheric portion whereby a predetermined degree of opening is provided to the orifice in the valve body.

10 Claims, 9 Drawing Figures

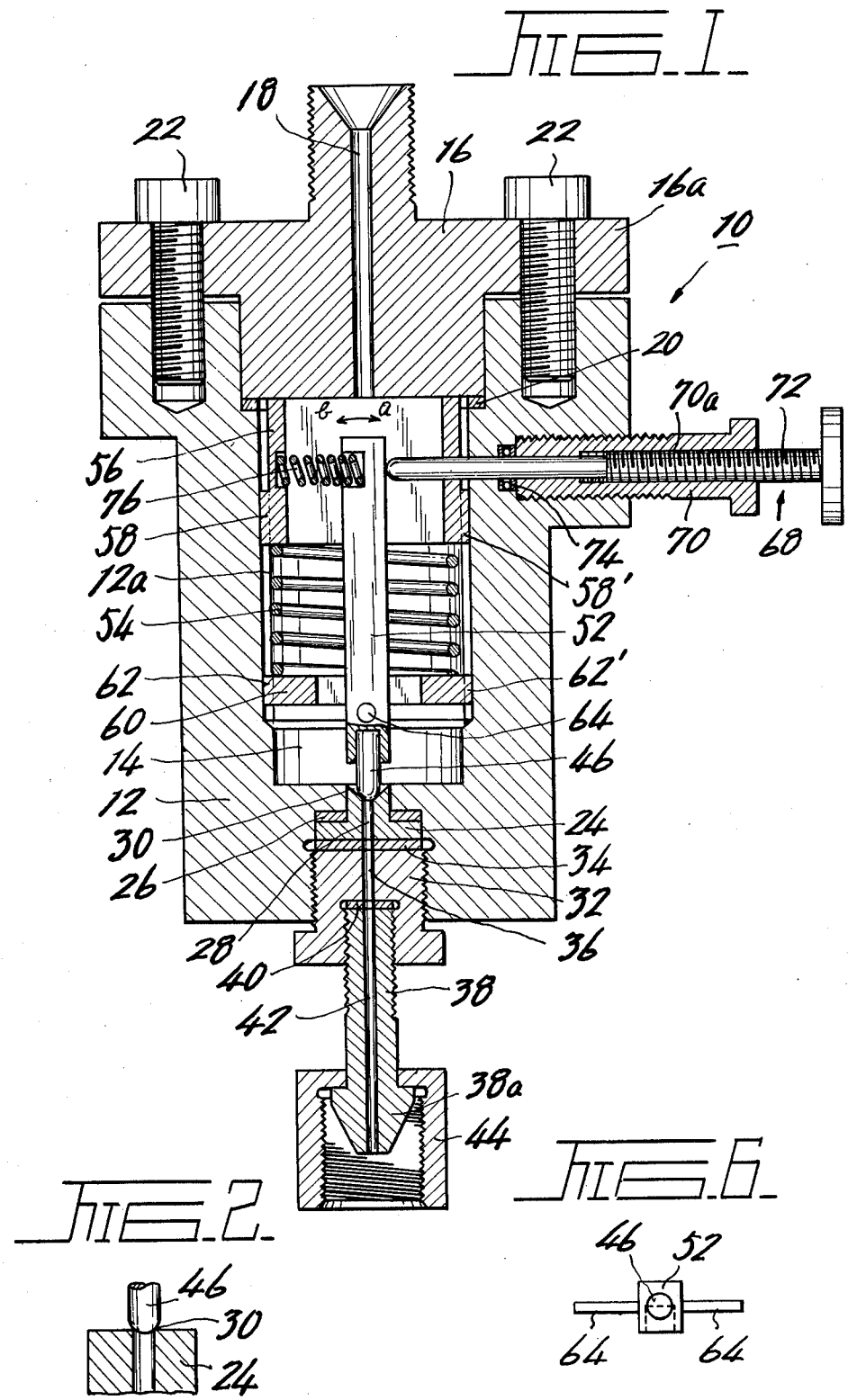

INFINITESIMAL GAS FLOW REGULATOR

FIELD OF THE INVENTION

This invention relates generally to an infinitesimal gas flow regulator, and in particular, to a gas flow regulator adapted to feed an infinitesimal quantity of gas into a gas blowing thermoplastic resin extruder whereby a foamed plastic article is produced.

BACKGROUND OF THE INVENTION

In order to feed an infinitesimal quantity of a highly pressurized gas from the primary side of a gas passage to the secondary side thereof, there has been used a needle regulator which comprises a tapered needle axially movable relative to a cylindrical value passageway to regulate gas flow through the needle regulator. However, since the gap between the wall of the valve passageway and the needle should be as small as less than 1 micron, it has been difficult to center the needle relative to the wall of the valve passageway, and as a result, the gas flowing therethrough could not be precisely regulated. In addition, in case a highly pressurized gas flows through the narrow gap at a more or less sonic velocity, the needle is cooled due to the heat absorption by the gas produced by its adiabatic expansion, and therefore the needle is axially contracted. This causes the substantially same result as that accomplished by withdrawing the needle, and therefore, the degree of opening of the regulator tends to vary to a relatively large degree.

SUMMARY OF THE INVENTION

Accordingly, it is a principal object of the present invention to provide a gas flow regulator adapted to precisely regulate an infinitesimal quantity of gas flowing therethrough in an effective manner.

In is another object of the present invention to provide a gas flow regulator adapted to prevent irregular gas flow therethrough.

In accordance with the present invention, there is provided an infinitesimal gas flow regulator comprising a casing including a primary gas passage provided therein; a valve seat member mounted on said casing and having a valve seat provided at a gas inlet thereof, said valve seat member including a secondary gas passage to communicate with said primary gas passage; a valve body disposed in said casing and including a hemispheric portion seated on said valve seat of said valve seat member so that said valve body is rollingly movable about the center of said hemispheric portion of said valve body while said valve body is kept on said valve seat, said valve body having in said hemispheric portion an orifice in the form of a notch provided to communicate said primary gas passage with said secondary gas passage in said valve seat member in a controllable manner through said orifice; and adjusting means to adjust the position of said valve body about the center of said hemispheric portion whereby a predetermined degree of opening of said orifice is achieved.

BRIEF DESCRIPTION OF THE DRAWINGS

The above and other objects and features of th present invention will be apparent from the description of the embodiment taken with reference to the accompanying drawings wherein;

FIG. 1 is a vertical sectional view of an infinitesimal gas flow regulator in accordance with the present invention;

FIG. 2 is a fragmentary and vertical sectional view of a modified valve seat member with a valve body shown seated on the valve seat of the valve seat member;

FIG. 6 is a bottom view of an assembly of the valve body and a valve motion modifying arm attached to the valve body.

DETAILED DESCRIPTION OF THE EMBODIMENT

Figure 3A:
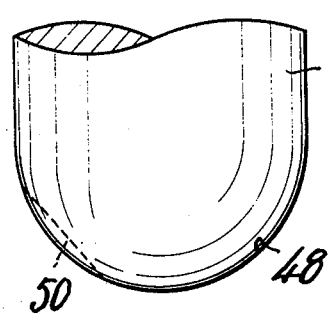
FIG. 3A is an enlarged and fragmentary front view of a valve body used in the regulator of FIG. 1.

FIG. 1 shows one embodiment of an infinitesimal gas flow regulator 10 in accordance with the present invention, and this regulator comprises a casing 12 having a primary gas passage 14 provided therein. A gas inlet member 16 including a gas inlet 18 to communicate with the primary gas passage 14 is provided at the inlet end of the casing 12 and is sealingly fitted into the upper wall of the casing 12, with a packing 20 held between the gas inlet member 16 and the upper wall of the casing 12. This gas inlet member 16 is mounted on the casing 12 with a flange 16a of the gas inlet member secured to the upper end face of the casing 12 by screws 22.

A valve seat member 24 has a reversely T-shaped cross section and is sealingly fitted into the lower wall of the casing 12 with a packing 26 held between the valve seat member 24 and the lower wall of the casing 12. The valve seat member 24 includes an axial secondary gas passage 28 communicating with the primary gas passage 14. The valve seat member 24 at the top end of the secondary gas passage has a concave frusto-conical valve seat 30 on which is seated a valve body 46 later described. Alternatively, as shown in FIG. 2, the valve seat 30 may comprise the corner of the upper end of the secondary gas passage 28 and the upper end of the valve seat member 24.

A tightening adapter 32 is threadedly received in the lower wall of the casing 12 so as to tighten the valve seat member 24 against the casing 12, with a packing 34 held between the valve seat member 24 and the adapter 32 so that they sealingly engage each other. The adapter includes a leading gas passage 36 communicating with the secondary gas passage 28.

An outlet member 38 at the top end is threadedly received into the tightening adapter 32 with a packing 40 sealingly held between the outlet member 38 and the adapter 32, and at the lower end has a reversely frusto-conical head 38a. The outlet member 38 also includes an outlet gas passage 42. A connector 44 which may be a cap nut is shown to be mounted on the head 38a of the outlet member 38 and is adapted to connect the outlet member 38 with an inlet member of a device such as an extruder barrel which is to be supplied with an infinitesimal quantity of gas so as to produce a foamed resin article.

Figure 3B:
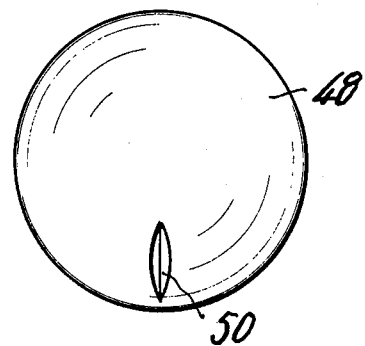
FIG. 3B is a bottom view of the valve body of FIG. 3A.

The valve body 46, which in the illustrated embodiment, comprises a stub having at the lower end thereof a hemispheric portion 48 seated on the valve seat 30 so that it is pivotally movable about the center of the hemispheric portion as shown in FIGS. 3A and 3B while the valve body 46 is seated on the valve seat 30, has an orifice 50 in the form of a notch provided in the hemispheric portion 48 to communicate the primary gas passage 14 with the secondary gas passage in a controllable manner. Thus, if the valve body 46 pivotally moves about the center of the hemispheric portion thereof, the degree of opening of the orifice 50 varies according to the amount of the pivoting movement of the valve body. It should be noted that the valve body can move in a stable manner because it remains seated on the valve seat 30 of the valve seat member 24 during movement of the valve body. It will be appreciated that the valve body 46 may be alternatively in the form of a sphere, the lower hemispheric portion of which is rollingly seated on the valve seat 30 of the valve seat member 24.

An arm 52 which is disposed axially of the casing 12, is secured to the upper end of the valve body 46 by any suitable means such as welding. The arm 52 serves to magnify the motion of the stub-like valve body 46.

Figure 4:
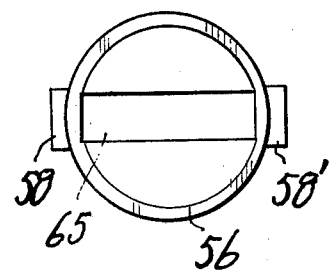
FIG. 4 is a top view of an upper spring engaging member used in the regulator of FIG. 1.
Figure 5:
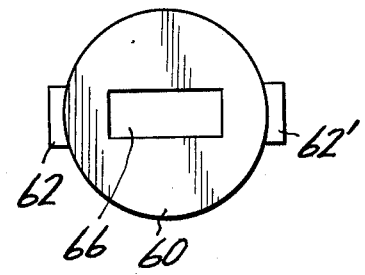
FIG. 5 is a top view of a lower spring engaging member used in the regulator of FIG. 1.

A valve body thrusting spring 54 is disposed around the arm 52. An upper spring engaging member 56 which includes a pair of guides 58 and 58' (FIG. 4) slidably engaged with a pair of longitudinal grooves 12a in the casing 12, engages the upper end of the thrusting spring 54 with the upper end of the spring engaging member 56 engaging the inlet member 16, while a lower spring engaging member 60, which includes a pair of guides 62 and 62' (FIG. 5) also slidably engaged with the pair of longitudinal grooves 12a in the casing 12, engages the lower end of the thrusting spring 54. The arm 52 includes a pair of pins 64 extending from the arm normal to the axis of the arm and the lower spring engaging member 60 is seated on the pair of pins 64, so that the valve body 46 at the hemispheric portion is always seated on the valve seat 30 of the valve seat member 24. As shown in FIGS. 4 and 5, respective openings 65 and 66 in the upper and lower spring engaging members 56 and 60, through which the arm 52 extends, are oblong so as to permit the arm to pivotally move about the center of the hemispheric portion of the valve body 46.

Adjusting means 68 to adjust the pivotal position of the valve body 46 about the center of the hemispheric portion thereof, comprises a stationary guide 70 having a threaded and axial hole 70a therethrough and screwed into the cylindrical wall of the casing 12 in a radial direction, and an adjusting screw 72 threadedly extending through the hole 70a in the stationary guide 70, with the leading non-threaded end of the adjusting screw 72 further extending through the cylindrical walls of the casing 12 and of the upper spring engaging member 56 and then engaging the upper end of the arm 52. An O-ring 74 is disposed around the adjusting screw 70 and between the cylindrical wall of the casing 12 and the leading end face of the stationary guide 70 so that the adjusting means is sealed against leakage of the gas in the casing 12. A coil spring 76 which is mounted between and engages the upper spring engaging member 56 and the arm 52 at the upper end thereof, serves to press the arm 52 against the leading end of the adjusting screw 72. Thus, if the screw threadedly moves either in the advancing or withdrawing direction relative to the arm 52, then the valve body 46 together with the arm 52 pivots about the center of the hemispheric portion 48 of the valve body, so that the degree of opening of the orifice 50 varies as described hereinbelow.

Figure 7A:
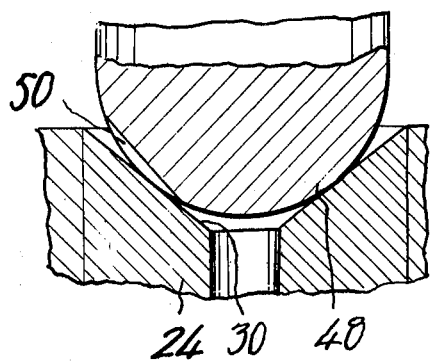
FIGS. 7A and 7B illustrate two different positions of the valve body wherein the degree of opening of the orifice in the regulator varies.
Figure 7B:
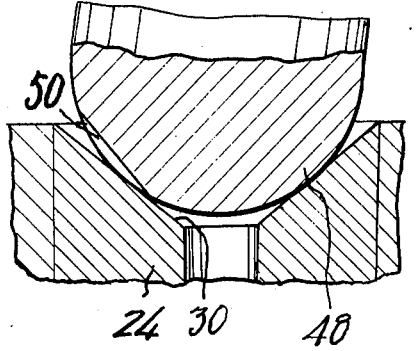

In operation, when the valve body 46 is in an upright position as shown in FIG. 1, the orifice 50 is positioned relative to the valve seat 30 as shown in FIG. 7A, to provide a certain degree of opening to the orifice 50. If the adjusting screw 72 rotates in one direction to retract the leading end of the screw 72 relative to the arm 52, then this arm pivotally moves in a clockwise direction as shown by the arrow *a* in FIG. 1, about the center of the hemispheric portion 48 of the valve body 46, and as a result, the valve body is inclined in the same direction as shown in FIG. 7B to provide a smaller degree of opening to the orifice 50. If the arm 52 further rotates in the same direction until the orifice 50 is separated from the valve seat 30, then the orifice is closed to prevent gas from flowing through the orifice. Conversely, if the adjusting screw 72 rotates from its position shown in FIG. 1 in the other direction to advance the leading end of the screw, then the arm 52 pivotally moves in a counterclockwise direction as shown by the arrow *b* in FIG. 1 about the center of the hemispheric portion 48 of the valve body, and as a result, the valve body 46 is inclined in the same direction to provide a larger degree of opening to the orifice 50. Thus, it will be understood that a large degree of motion of the arm 52, and as a result, a large amount of advance or retraction of the screw 72 causes the degree of opening of the orifice 50 to vary in a precise and infinitesimal manner because the valve body is always kept on the valve seat 30 in a stable manner. It should be noted that even though the temperature of the valve body 46 varies due to the heat absorption by the gas due to its adiabatic expansion, the cross sectional area of the orifice 50 slightly varies at substantially the same ratio as that at which the valve body 46 is cubically expanded, and therefore, the degree of opening of the regulator scarcely varies.

While one preferred embodiment of the present invention has been illustrated and described with reference to the accompanying drawings, it will be understood that it is by way of example, and that various changes and modifications in components and arrangement may be made without departing from the spirit and scope of the invention, which is intended to be defined only by the appended claims.

What is claimed is:

1. An infinitesimal gas flow regulator comprising: a casing having a primary gas passage provided therein; a valve seat member mounted in said casing and having a valve seat provided at the gas outlet from said primary gas passage, said valve seat member including a secondary gas passage for communicating with said primary gas passage; a valve body disposed in said primary gas passage of said casing and including a hemispheric portion rollingly seated on said valve seat of said valve seat member for pivotal movement of said valve body about the center of said hemispheric portion of said valve body while said valve body is on said valve seat, said valve body having a notch in said hemispheric portion cooperable with said valve seat for communicating said primary gas passage with said secondary gas passage in said valve seat member in a controllable manner through said notch; and an arm disposed in said primary gas passage of said casing and attached to said valve body radially of the center of said hemispheric portion of said valve body; and adjusting means engaging the free end of said arm for pivotally moving said arm by the adjustment of said adjusting means for adjusting the pivotal position of said valve body about the center of said hemispheric portion, whereby said notch is opened and closed to a predetermined degree.

2. An infinitesimal gas flow regulator as set forth in claim 1, further comprising spring means disposed in said primary gas passage of said casing and urging said valve body against said valve seat.

3. An infinitesimal gas flow regulator as set forth in claim 2, wherein said spring means comprises a coil spring disposed in said primary gas passage of said casing and around said arm, an upper spring engaging member mounted on said casing engaged by the upper end of said coil spring and a lower spring engaging member slidably disposed in said primary gas passage of said casing and engaged by the lower end of said coil spring, said lower spring engaging member engaging said arm, whereby said valve body is urged toward said valve seat.

4. An infinitesimal gas flow regulator as set forth in claim 1, further comprising a gas inlet member including a gas inlet to communicate with said primary gas passage in said casing.

5. An infinitesimal gas flow regulator as set forth in claim 1, wherein said adjusting means comprises a stationary guide secured to said casing and having a threaded hole therethrough; and an adjusting screw threadedly extending through said threaded hole in said stationary guide, with the leading end of said adjusting screw further sealingly extending through said casing and engaging said arm at the top end and being movable relative to said arm whereby said arm pivotally moves.

6. An infinitesimal gas flow regulator as set forth in claim 5, further comprising spring means urging said arm against said leading end of said adjusting screw.

7. An infinitesimal gas flow regulator as set forth in claim 1, wherein said valve body comprises a stub having at one end said hemispheric portion.

8. An infinitesimal gas flow regulator as set forth in claim 1, wherein said valve seat is concavely frusto-conical.

9. An infinitesimal gas flow regulator as set forth in claim 1, wherein said valve seat comprises the corner of the inlet end of said secondary passage and the end of said valve seat member.

10. An infinitesimal gas flow regulator as set forth in claim 3, further comprising a gas inlet member including a gas inlet to communicate with said primary gas passage in said casing, and said upper spring engaging member engaging said gas inlet member.

* * * * *